Oct. 19, 1926.

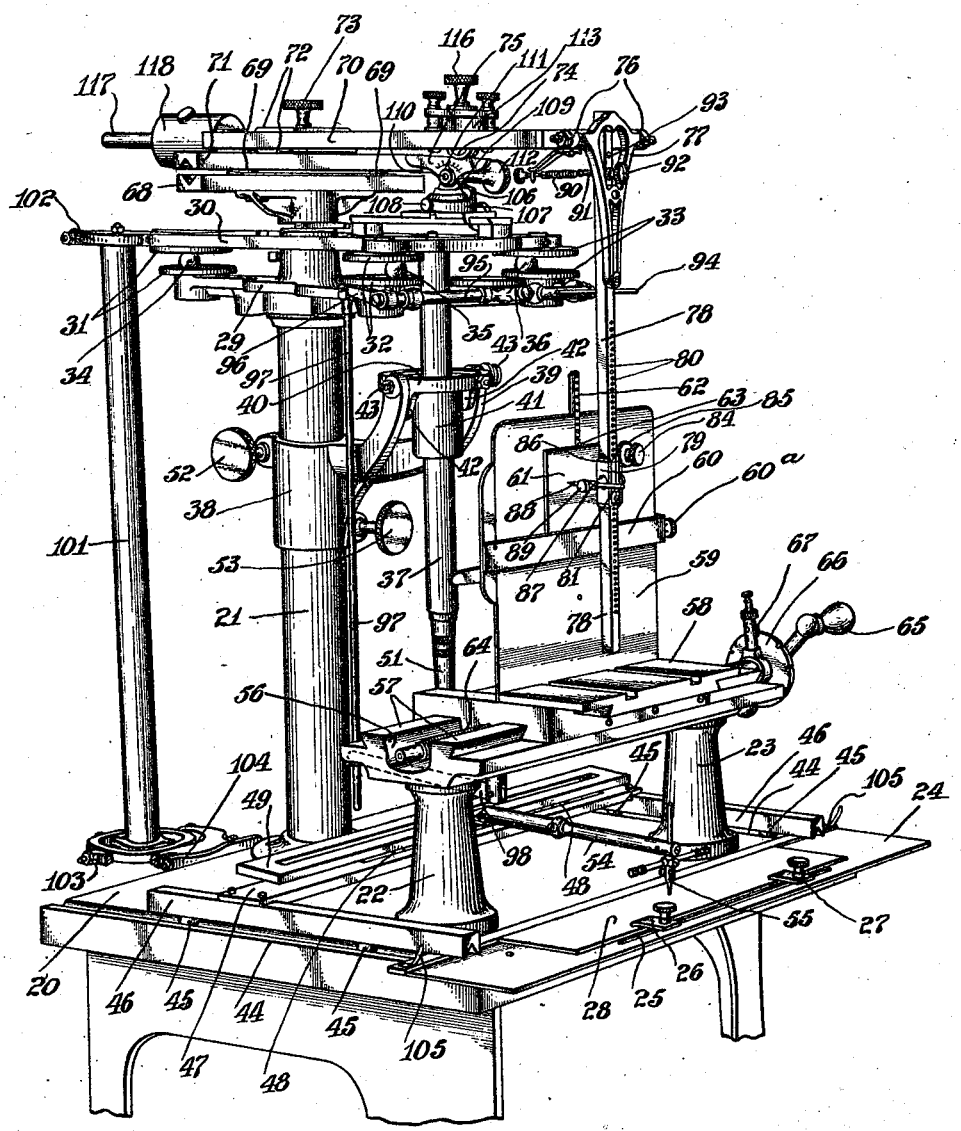

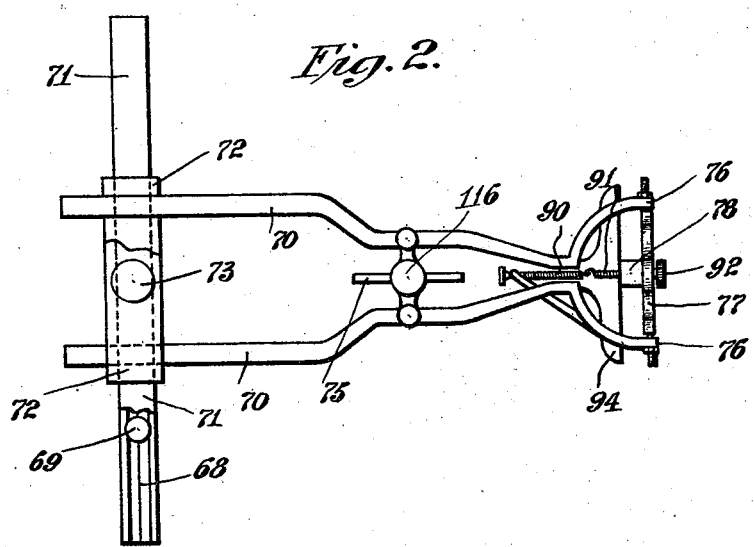
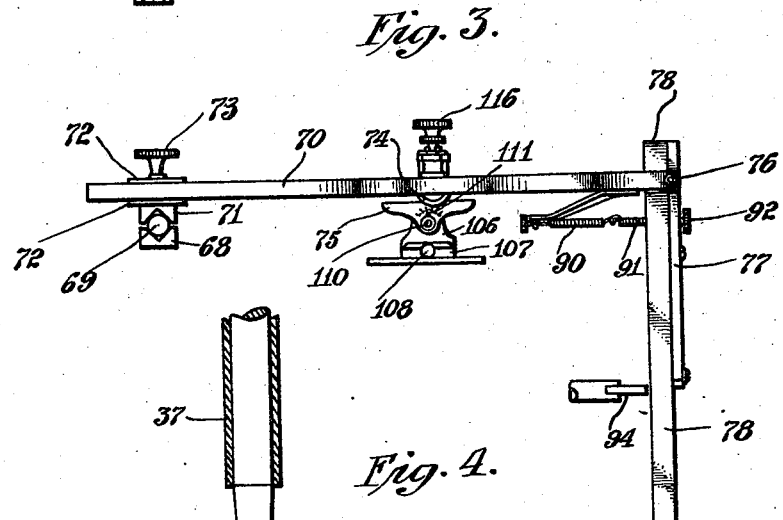
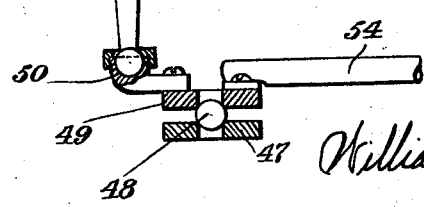

W. S. EATON 1,603,332

ETCHING OR LIKE MACHINE

Filed Nov. 19, 1923     4 Sheets-Sheet 3

William S Eaton INVENTOR

BY Francis P Wentworth
his ATTORNEY

Oct. 19, 1926.
W. S. EATON
1,603,332
ETCHING OR LIKE MACHINE
Filed Nov. 19, 1923    4 Sheets-Sheet 4
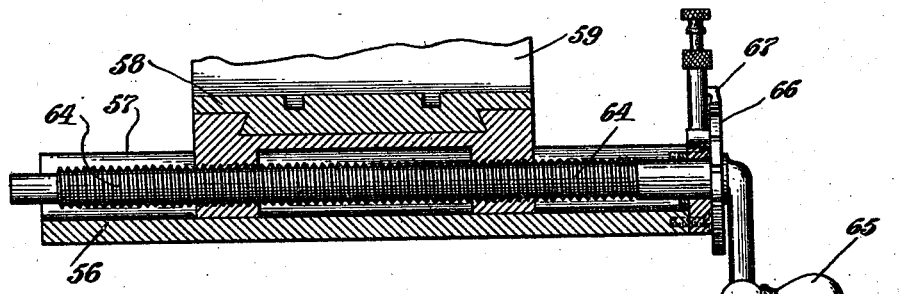
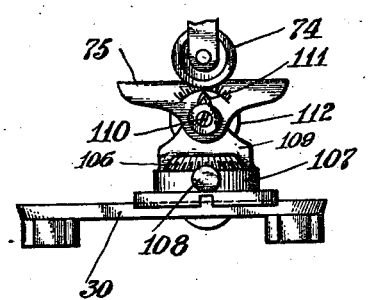
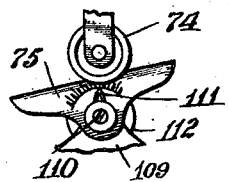
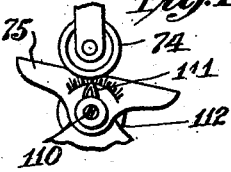
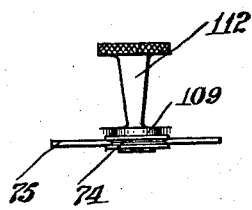
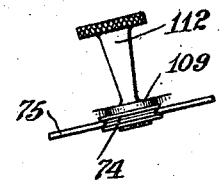
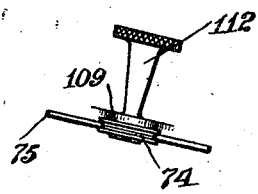
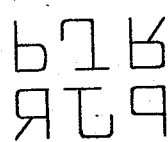
INVENTOR
William S. Eaton
BY
Frank P. Wentworth
ATTORNEY Patented Oct. 19, 1926.

1,603,332

UNITED STATES PATENT OFFICE.

WILLIAM S. EATON, OF SAG HARBOR, NEW YORK.

ETCHING OR LIKE MACHINE.

Application filed November 19, 1923. Serial No. 675,642.

My invention relates to etching or like machines, and more particularly to a machine of this type wherein the work plate or sheet and the pattern will both be within the line of vision of the operator so as to permit the condition of the work to be noted as it progresses, and thus avoid the necessity for the repeated interruption of the operator in the actuation of the tracing stylus in order to inspect the plate.

Heretofore in machines designed to do work of the same character as is done by the machine of my present invention, the work support and the pattern table have been arranged on parallel horizontal planes, the work support being upon a higher plane than the pattern table so that inspection of the work required the operator to stand, although the tracing stylus might be used while the operator was seated.

Since frequent inspection is necessary, the above conditions had the effect of reducing the capacity output of a machine and of making its operation awkward for the operator in the event that it were attempted to actuate the tracing stylus with relation to the pattern while in a position to, at the same time, observe the working conditions of the work point.

With the above conditions in mind, I have devised a machine wherein the work supporting table has the nature of an easel by means of which the work plate or sheet may be supported upon a plane at right angles to that of the pattern table and slightly above same so that the operator may move the stylus in accordance with the depressed lines of a pattern to impart the desired corresponding movement to the work point arm, and at the same time closely follow the movements of the point carried by said arm and constantly observe the working conditions at the plate. This arrangement of the work support not only requires movement of the work point arm toward and from the support to ensure the engagement or disengagement of the point with the plate, but requires an actuating mechanism for this arm which will convert the universal movement upon a horizontal plane of an actuating carriage to a movement of the arm at right angles to this plane for describing vertical lines, and a movement upon a horizontal plane corresponding with the plane of universal movement of the actuating carriage for describing horizontal lines, both movements of necessity being such as not to interfere with the engaging relation of the work point with the plate.

It is desirable to have all of the working mechanisms of the machine rearwardly of the easel-like work support so as to afford a clear field of vision forwardly of said support, which condition necessitates a particular construction of stylus arm and transmitter arm for ensuring the desired universal movement of the latter while affording sufficient rigidity in the actuating means to secure the desired accuracy in the movement of the carriage receiving its motion from said transmitter arm. I also provide supplemental means for preventing that minute distortion in the reproduction due to a slight skewing motion of the actuating carriage, although this mechanism is not essential to the invention, as the distortion is not great and may be corrected by other known means.

In a machine embodying my invention, the construction is such that the operative leverage of the transmitter arm may be varied to control what may be termed the "normal scale" of the reproduction, although the length of the vertical lines are controlled by a mechanism carried by the actuating carriage, which mechanism is that heretofore referred to as converting the fore and aft movement of the carriage upon a horizontal plane, into a vertical movement of the work point carrying arm. It is apparent that this mechanism must be capable of adjustment to permit it to be so set as to conform the relative vertical movement of the work point carrying arm to the effective lateral leverage of the transmitter arm.

This adjustability of the mechanism for imparting vertical movement to the work point carrying arm may also be employed to utilize the operative effect of the transmitter arm to cause an increased or reduced length of the vertical lines of the reproduction as compared with the "normal scale" of such lines as determined by the setting of the transmitter arm, to extend or condense the reproduced letters, characters or designs. This mechanism is preferably also so constructed that it may be so set as to cause the work point carrying arm during its vertical movement, to have a horizontal or lateral component, and impart obliquity to the vertical lines of the reproductions, or give a tilt thereto, it being possible to utilize this adjustment whether the letters, numerals or designs are being reproduced to "normal scale" or whether they are extended or condensed, as above referred to.

The adjustability of the mechanism for converting the fore and aft movement of the actuating carriage into a vertical movement of the work tool supporting arm, may also be utilized to cause the movement of the work point when describing the vertical lines, to be either in a direction the reverse of that of the tracing stylus with relation to the lines of the pattern, or in accord with the movements thereof, with the result that the letters, numerals or portions of the design being reproduced will be described upon the work plate or sheet upside down, but otherwise in conformity with the pattern, or be described in the same vertical position as upon the pattern but reversed as to the relation of the horizontal lines to the vertical lines in the several elements of the reproduction, such reproductions being reversed as to the individual letters, numerals or parts of the design as compared with the pattern, but reading from the same position.

The work point carrying arm has a normal tendency to move into engaging relation with the work plate or sheet and to continue in such relation with substantially uniform pressure conditions so as to avoid likelihood of defacing the metal of a plate when such is used, and to limit the operative effect of the point to the removal of the resist with which this plate is surfaced.

While the arm has the tendency above noted, I provide means permitting the free vertical and lateral movement of the arm, but normally engaging same and moving it away from the work plate, so that while this arm has a normal tendency to move so as to engage the work point with the plate, it may nevertheless be so restrained as to be normally so held as to maintain the work point out of engagement with the plate.

I also provide means whereby the work point may be moved longitudinally of its supporting arm to secure line spacing in the reproduction, or a desired positioning or placing of the reproduction upon the plate. This latter, however, may also be secured by adjustments upon the easel-like work support.

In machines of the general type to which my invention relates, it is possible to use a pattern which may be set up the same as ordinary type, or to use a plate having all of the letters and the digits thereon, and bring the desired letters or digits successively into the same position with relation to the pattern support, the spacing of the letters or digits with relation to each other being effected through movement of the work support. The machine of my present invention is capable of the same mode of operation, special means, however, being provided to effect the spacing of the letters with relation to each other through the movement of the easel-like support laterally of the machine.

The invention consists in the novel features of construction and combination of parts hereinafter set forth and described, and more particularly pointed out in the claims hereto appended.

Referring to the drawings:—

Fig. 1 is a perspective view of the upper portion of a machine embodying my invention;

Fig. 2 is a plan view of the work point carrying arm and the support therefor showing a plan view of a portion of the mechanism for imparting a vertical movement of said arm;

Fig. 3 is a side view thereof;

Fig. 4 is a detail view of the lower connection of the transmitter arm and the stylus arm with, and a cross-sectional view of a portion of, the carriage forming a part of this mechanism;

Fig. 8 is a cross-section of the carriage for the easel-like work support and the mechanism for imparting movement thereto for spacing the letters or digits thereon;

Figure 5:
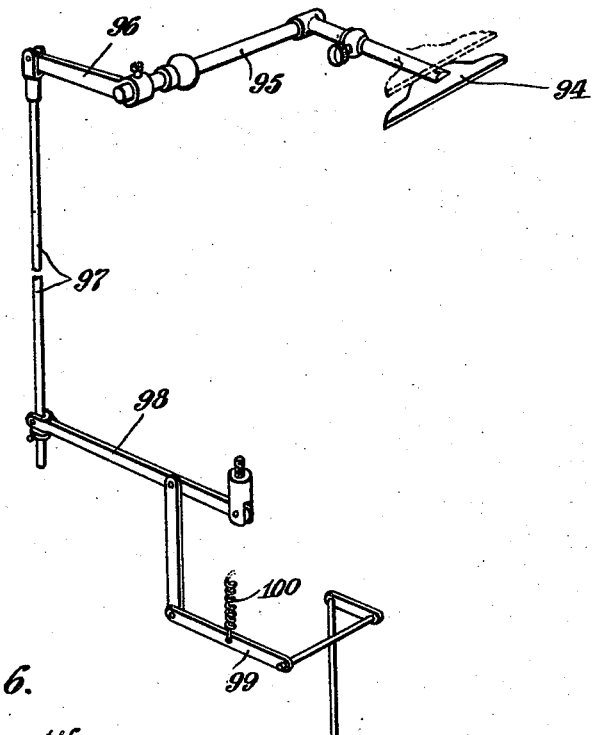
Fig. 5 is a detail perspective view of the mechanism for imparting movement of the work supporting arm for engaging or disengaging the work point carried thereby with the work plate.
Figure 6:
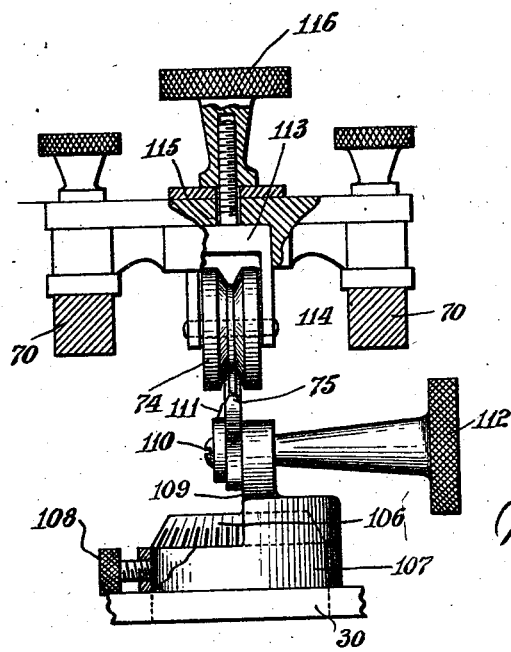
Fig. 6 is a detail view of the adjustable part of the mechanism for imparting and controlling vertical movement of the work tool supporting arm.
Figure 7:
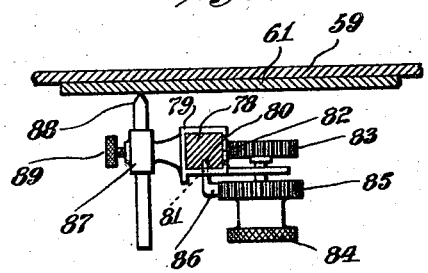
Fig. 7 is a cross-section of the work tool supporting arm, showing the manner of adjusting the work point longitudinally thereof for line spacing.

Figs. 9 to 14 inclusive are detail views showing different adjustments of the member of the actuating carriage for imparting movement to the work point supporting arm;

Fig. 15 is a diagram showing the letters upon a pattern, and a reproduction of these letters, when the machine is set to reproduce the letters upside down as compared with their position upon the pattern; and Fig. 16 is a similar diagram illustrating the position of the letters upon the pattern and their position in the reproduction when the machine is set to reverse the letters in the reproduction, but to have them read from the same position as upon the pattern.

Like numerals refer to like parts throughout the several views.

In the embodiment of my invention shown in the drawings, 20 indicates the table of the machine. Projecting upwardly from said table is a column 21 supporting the mounts for the transmitter arm, the movable support for the work point carrying arm, and the carriage for the actuating mechanism for said arm. This column is positioned rearwardly of the table 20. Forwardly of said table are short columns 22 and 23 forming a support for the work plate support. Along the front edge of the table 20 is a forward extension 24 having a laterally extending slot 25 for adjustable clamps 26 and 27 which are used to secure a pattern plate 28 upon the extension 24 which latter forms the pattern table of the machine.

Carried by the column 21 is a suitable supporting frame 29 upon which is mounted a carriage 30, the manner of mounting this carriage being such as to permit it to have universal movement upon a single horizontal plane.

In the form of the invention shown, the carriage 30 is supported from the frame 29 by means of three pairs of cupped bearing members 31, 32 and 33, and bearing balls 34, 35 and 36 positioned between the cups of each pair respectively. The pairs of cups 31, 32 and 33 are triangularly arranged so as to afford the desired divergent supporting points for the carriage 30. The general construction and manner of supporting the carriage 30 is old and well known in this art, and is not essential to the invention, since other well known supporting means for permitting the desired universal movement may be substituted therefor.

Movement is imparted to the carriage 30 by a transmitter arm 37, one end of which is connected to said carriage by means of a universal joint of any desired type, in a manner well known in this art, and the other end of which is adapted to be oscillated by and in accordance with a design upon the pattern plate 28 through the medium of a stylus which is operatively connected to said transmitter arm in a manner which will be more fully referred to hereinafter.

The transmitter arm 37 is pivotally supported to have universal movement by a sleeve 38 adjustably mounted upon the column 21, a fork 39 carried by said sleeve, a universal joint or compass mount 40 pivoted between the arms of said fork, and a sleeve 41 carried by one of the members of said universal joint and slidably mounted upon the transmitter arm 37. The outer ring of the universal joint 40 is adjustable with relation to the arms of the fork 39 by means of lugs 42 and pivot screws 43 carried by said fork co-operating with said ring, for the purpose of permitting variance in the length of the horizontal lines of the reproduction, relative to the vertical lines thereof.

Carried by the table 20 are oppositely disposed tracks 44 having therein, respectively, upwardly presented raceways extending fore and aft, or longitudinally, of the machine. Mounted upon said tracks by means of bearing balls 45 is a carriage, the side frames 46 of which are positioned above and extend parallel with the tracks 44 respectively, and provided with downwardly presented raceways adapted to receive the bearing balls 45. Extending laterally of the machine, from one of said side frames to the other, is a cross bar 47 having an upwardly presented raceway therein adapted to receive a plurality of bearing balls 48 upon which are mounted a carriage 49 having a downwardly presented raceway therein engaging the bearing balls 48. The lower end of the transmitter arm 37 is connected to the carriage 49 by means of any desired form of universal joint, one member 50 of which joint is carried by said carriage 49, and the other member of which is carried by an extension 51 of the transmitter arm 37, which extension is slidably mounted in said transmitter arm so as to telescope within same and to compensate for the varying length of said arm due to its oscillations and the fact that both ends thereof always have movement in parallel planes.

The sleeve 38 is vertically adjustable upon the column 21 by means of the usual rack and pinion movement 52 and clamp screw movement 53, both of which mechanisms are old and well known in this art.

Secured to the carriage 49 so as to impart movement thereto, is a stylus arm 54 provided with the usual tracing stylus 55, said arm projecting forwardly of the carriage 49 in a manner to bring said stylus in the desired engaging relation with the pattern plate 28.

The manner of mounting the carriage 49 permits said stylus 55 to have the necessary oscillatory movement to bring it into and out of engagement with the lines upon the plate 28, since said carriage may turn freely upon the bearing balls 48, although its movements laterally of the machine are limited to a lineal traverse by said bearing balls and the raceways co-operating therewith.

While in actual practice, I have found the above construction of transmitter arm, stylus arm and intermediate superimposed carriages respectively having movement at right angles to each other, to be effective in securing the desired accuracy in the movements of the transmitter arm 37—51, and to have certain advantages as compared with other well known means of connecting a transmitter arm with a stylus arm, it is apparent that the particular construction as shown is not essential to the operation of a machine embodying my invention, and that other means may be substituted therefor, if extreme accuracy is not desired, or if conditions exist which justify the sacrificing of the advantages secured by the transmitter arm controlling mechanism constructed as described.

Carried by the columns 22 and 23 is a bed plate 56 having laterally extending ways 57. Mounted upon said ways is a carriage 58 carrying a work support 59 which is of easel-like construction and preferably has a smooth face occupying a vertical plane, or a plane at right angles to that of the pattern supporting table 24. Adjustably secured to the support 59 is a T-square 60 which may be secured in any position with relation to said support and is adapted to serve as a rest for the work plate 61. The support 59 has set in the upper part thereof, a bar 62 having a sequence of spaced openings as shown, adapted to receive a pin 63 in engaging relation with the upper edge of the plate 61 so as to hold this plate firmly in position against the straight edge of the T-square 60. Said straight edge is provided with a set screw 60ª engaging one edge of the support 59 so as to firmly clamp the T-square in position upon said support and permit adjustment thereof toward and from the pin 63.

Rotatably mounted with relation to the bed plate 56 is a lead screw 64 having an actuating handle 65, which lead screw engages with co-operating screw threads upon the carriage 58 so as to permit this carriage to be moved laterally of the machine in either direction to secure the desired spacing of different characters in the reproduction, or of the whole design upon a plate, as a result of the movement of the work support. This spacing mechanism need be used for spacing characters, however, only when long lines are to be etched upon the work plate 61, with individual patterns, or when a pattern plate is used containing all of the letters and digits, which pattern plate in its entirety is shifted and centered in relation to the work plate as succeeding letters or other characters are to be produced.

Carried by the lead screw 64 is a gauge wheel 66 having spaced notches about its edge co-operating with a ratchet stop 67, to assist in securing accuracy in the spacing movement of the carriage 58.

Carried by the column 21 is a laterally extending track 68 having an upwardly presented raceway for bearing balls 69, said track 68 forming a means for permitting lineal lateral movement of the movable support for the work point carrying arm for causing horizontal lines to be described on the plate 61, and vertical oscillatory movement thereof for causing vertical lines to be described on said plate.

Said movable support comprises a frame 70 carrying a laterally extending track 71 parallel with and above the track 68 and having a downwardly presented raceway therein adapted to engage the bearing balls 69. The frame 70 in the accompanying drawings is shown as being connected to the track 71 by means of the clamp plates 72 and clamp screws 73 which, however, is a mere detail of construction to facilitate the positioning of the frame 70 to secure accuracy in the relation of the work point carrying arm to the support 59. Adjacent the forward end of the frame 70, or the end opposite to its point of connection with the track 71, is a bearing wheel 74 adapted to ride upon an actuating member 75 carried by, and movable with, the carriage 30. The wheel 74 is a double flanged wheel, the flanges of which straddle the actuating member 75. The member 75 must be arranged at an incline to impart vertical oscillatory movement to the frame 70 to cause vertical lines to be described upon the work plate 61, and lateral movement of the frame 70 will result from the lateral thrust upon the wheel 74 through the member 75. The vertical oscillatory movement of the frame 70 results from the movement of the member 75 tangentially of the wheel 74.

While I have described the construction by which the engaging relation for imparting lateral thrust to the frame 70 through the medium of the member 75, as being a flanged wheel 74 straddling said member 75, it is apparent that any other desired construction for securing this result may be used, although the co-operating tongue and groove arrangement resulting from the use of the flanged wheel and narrow plate of the member 75, has the advantage that the co-operating parts may be so closely fitted as to avoid any material lost motion at this point which might develop error in the reproduction.

The wheel 74 and member 75 are capable of certain adjustments to vary the character of the reproduction, which adjustments will be more particularly referred to hereinafter.

The forward end of the frame 70 is provided with a fork 76 between the arms of which is pivoted a frame 77 carrying a vertically depending rigid work point carrying arm 78, having sufficient length to permit the work tool or point to be brought into operative engagement with any part of a work plate upon substantially any portion of the support 59.

To permit the reproduction to be placed upon any portion of the plate 61, and also to facilitate the spacing of the lines of the reproduction, I mount upon the arm 78, a sleeve 79 capable of adjustment longitudinally of the arm 78, or vertically in relation to the support 59. To facilitate accuracy in the adjustment of the sleeve 79, I provide the arm 78 with a sequence of spaced notches or depressions indicated at 80, and provide the sleeve 79 with a ratchet tongue 81 adapted to enter any of said notches and hold the sleeve in any adjusted position. The vertical movement of the sleeve is effected by means of a rack 82 carried by the arm 78, a pinion 83 meshing therewith and carried by an extension of the sleeve 79, and an actuating wheel 84 carried by the shaft of said pinion. The shaft of the pinion 83 also carries a ratchet wheel 85 adapted to be engaged by a spring pawl 86 upon the sleeve 79, which pawl and ratchet mechanism will co-operate with the pawl 81 in preventing accidental movement of the sleeve 79 with relation to the arm 78. Extending laterally of the machine, and projecting to a sufficient extent from the sleeve 79 to secure the desired clear field of vision about same, is a holder or mount 87 for a work tool or point 88, said work point being adjustable with relation to said holder, or mount, by means of a set screw 89.

The work point carrying arm 78 is capable of oscillatory movement toward and from the support 59 about the pivots 76, it being preferable to provide means as a coiled spring 90 acting upon said arm adjacent its point of pivotal support to exert a normal tendency to move the arm toward said support. One end of the spring 90 is connected to an adjusting screw 91 passing through an opening in the upper part of the arm 78 and acted upon by an adjusting nut 92 so that the degree of pressure of the point against the plate may be regulated to that required to remove the resist from the surface of the plate 61 without likelihood of the work point 88 penetrating the metal of the plate. A plurality of openings, one of which is shown at 93 passing through the arm 78, may be used so that the effect of the spring may be controlled either by a variance in its tension or by a variance of the leverage at which it acts upon said arm. The other end of the spring is connected to an arm carried by the frame 70.

As a matter of convenience, it is preferable to have the arm move automatically toward the support 59 and in fact better work results from this practice, since the pressure at the point will always be uniform, while if the arm is forced toward the support 59, there may be a varying pressure with greater likelihood of scratching of the surface of the plate.

The normal tendency of the arm 78 to move toward the support 59 may be restrained by a laterally elongated bearing member 94 carried by a shaft 95 pivoted in suitable bearings upon the support 29. This member 94 is of sufficient length to engage the arm 78 at any point within its range of lateral movement so as to permit the disengagement of the work point with the plate 61 upon the support 59 at any time while the point is in operative relation to the plate 61.

The shaft 95 is provided with a crank arm 96 connected with a link 97, said link being pivoted to an oscillatory link 98. To raise and lower said link 98, I employ the ordinary crank shaft, link and pedal mechanism 99, this mechanism being shown more particularly in Fig. 5 of the drawings. The crank and pedal mechanism 99 is acted upon by a spring 100 having a normal tendency to actuate this mechanism in a manner to cause the bearing member 94 to be moved downwardly in an arc into engaging relation with the arm 78 so as to force it away from the work plate support 59, the upward movement of said member 94 under the control of the pedal and link mechanism 99 against the tension of the spring 100 imparting an upward movement to the member 94 so as to afford the necessary clearance to permit the arm 78 to move toward the work plate support 59.

With machines of this general type there is a tendency of the carriage 30, or similar carriages, to have a slight skewing action, particularly when the ball and cup universal support is employed, which is objectionable when high grade work is to be done on a machine. To correct this condition, I preferably use a parallel link movement consisting of a link 101 extending parallel with the transmitter arm 37—51, one end of this link being connected by a universal joint 102 with the carriage 30, and the other end thereof being connected by a universal joint with a yoke 103 mounted to have movement about a vertical axis in a frame 104 carried upon the rear edge of the table 20. This expedient, however, may be dispensed with, if desired, although I prefer to use same to prevent the slight distortion resulting from skewing action. When, however, the reduction of scale is considerable, this distortion is not apparent, except to a skilled workman.

Another difficulty I have found when operating machines, is the tendency of the machine to slightly overrun during the fore and aft oscillation of the transmitter arm 37—51. To correct this condition, I provide friction members 105 acting upon the side bars 44 of the carriage actuating the transmitter arm. While such friction members are highly desirable in securing the best operative effects in the machine, it is apparent that they may be dispensed with without materially affecting the operations of other mechanisms in the machine, particularly those for securing the desired observation of the work being done, and the particular mechanism for imparting universal movement to the work point upon a vertical plane.

The actuating member 75 for the frame 70 and the parts carried thereby, is capable of adjustment about a horizontal axis and also about a vertical axis, the former adjustment being for the purpose of causing any desired quantity of vertical movement of the frame 70 within the range of adjustment of said member; or for causing the reproduced characters to be inverted as compared with their position upon the pattern plate 28, or to be readable from the same position as upon said plate; and the latter adjustment being for the purpose of permitting the setting of the machine so that during vertical movements of the frame 70, a horizontal component will be imparted thereto so as to cause obliquity in the vertical lines of the reproduced characters. It is possible to pitch the letters in either direction according to the manner of adjustment of the member 75.

By adjusting the member 75 about its horizontal axis, I am also enabled to cause the actuation of the frame 70 and the parts carried thereby, to maintain the exact scale, in the reproduction of the characters, as defined by the adjustment of the leverage at which the transmitter arm acts; or modify the scale of the reproduction as to the vertical lines only by either increasing or decreasing the vertical movements of the frame 70 independently of the leverage of the transmitter arm, thus either extending or condensing the reproduced characters.

In the embodiment of the invention shown in the drawings, the above adjustments are secured by providing the carriage 30 with an upwardly extending bearing stud 106 upon which a sleeve 107 is rotatably mounted and capable of being set in any adjusted position by means of a set screw 108. The sleeve 107 has an extension 109 through which passes a bearing pin 110 upon which the member 75 is loosely mounted. This pin is fixed in relation to the sleeve 107, and has an index finger 111 secured thereto. The other end of the bearing pin 110 is screw-threaded and adapted to receive a clamp nut 112. The side of the member 75 adjacent the index finger 111 is provided with suitable graduations for the purpose of permitting accuracy in the setting of this plate.

When the member 75 is adjusted about its vertical axis, it is desirable to turn the flanged wheel 74 about a vertical axis to avoid unnecessary friction at this point, and avoid likelihood of the said wheel passing from the traction surface of said member. To permit this adjustment of said wheel, I journal its shaft in a forked swivel 113, mounted in a vertical bearing 114 and having a screw-threaded shank adapted to be engaged by a clamp nut 116. By loosening the clamp nut 116, the wheel 74 is permitted to turn freely about a vertical axis, the clamp nut 116 being used to lock the swivel in any adjusted position. The sleeve 107 and its bearing stud 106 may also be provided with suitable gauge markings to facilitate accuracy in the setting of the machine for introducing obliquity in the character of the reproduction.

Preferably I provide the frame 70 with an extension 117 having adjustably mounted thereon a weight 118 which will have the effect of counterbalancing said frame and the arm 78 carried thereby to an extent to ensure the desired ease in the operation of the machine, and reduce the variance in the resistance to the operation of the tracing stylus 55 when imparting vertical movement to the frame 70 through the member 75, particularly an upward movement of said frame.

The operation of the herein described mechanism is substantially as follows:—

In describing the operation of the machine, it will be assumed that the various parts are in the position shown in Fig. 1 of the drawings, and that a pattern plate bearing both upper and lower case letters and digits, is to be used upon the machine.

When a machine is set as shown, the position of the actuating plate 75 is such that the reproductions upon the plate 61 carried by the support 59 will read from the same position as the corresponding matter upon the plate 28, but will be severally reversed and in the aggregate read from right to left, instead of from left to right. In other words, the configuration of the several letters or characters will, in the reproduction, be the reverse of the same letters or characters upon the pattern plate 28, and their position in relation to each other will also be reversed, as required in printing.

The position of the actuating plate 75 corresponding with the showing of Fig. 1, is shown more clearly in Fig. 11 of the drawings, and in Fig. 16 the lower line of letters indicates the relation and formation of the letters upon the pattern plate 28, while the upper line represents the reproduction of these upon the plate 61. The angle to the horizontal at which the actuating plate 75 is set must be governed by the ratio of the portions of the transmitter arm 37—51 upon opposite sides of the pivots 43 in order to preserve the proportions between the vertical and horizontal plane of the reproduction as compared with those of the characters upon the pattern plate.

When a machine has been properly set, a plate 28 is positioned with the first letter in a definite position upon the pattern table 24 and the stylus 55 is passed along the depressed lines of this character with a resultant oscillatory movement of the transmitter arm 37—51 by the stylus arm 54 and the connection between this arm and the transmitter arm. Since the transmitter arm 37 is pivoted intermediate its ends, movements of the stylus 55 to the right or left causes a movement of the carriage 30 and the actuating plate 75 carried thereby, to the left or right of the machine; and movement of the stylus forwardly or rearwardly of the pattern will cause a rearward or forward movement of the carriage 30. The plate 75 being inclined forwardly of the machine, it is apparent that its rearward movement will permit the frame 70 to descend, carrying with it the work point supporting arm 78, and since the letters upon the pattern read properly, and not reversed as required in printing, the top of the letters will appear toward the top of the plate 61, since the normal tendency of the transmitter arm 37—51 to reverse the direction of movement of the work point is counteracted by the position of the plate 75. This plate 75, however, does not in any way modify the operative effect of the transmitter arm as to lateral movement of the frame 70 and arm 78 for describing horizontal lines. It will be understood that the universal mount for the carriage 30, and the tracks 68—71, permitting lateral and vertical movement of the arm 78 will introduce a lateral component of movement to the arm 78 during its vertical movement, where required, so as to permit the reproduction of lines of any configuration upon the plate 61.

The carriage 30 for the plate 75 while having universal movement upon a single plane, imparts only direct horizontal movement to the frame 70, which movements are in direct proportion to the corresponding movement of said carriage 30. Movements of said carriage fore and aft of the machine, however, impart no direct corresponding movements to the frame 70, the vertical lines in the reproduction resulting from oscillation of said frame 70 about a horizontal axis as a result of the inclination of the actuating plate 75.

The construction of the tracks 68—71 permits lateral lineal movement of the frame 70, and the vertical pivotal movement thereof, the pivots 76 compensating for any arc which may be described at the end of the frame 70 carrying said pivots, and permitting the work point supporting arm 78 to remain in a substantially vertical position and with the work point 88 in the desired operative engagement with the work plate 61.

Normally the bearing member 94 will hold the arm 78 outwardly of the support 59 against the tension of the spring 90, with the work point 88 out of engaging relation with the work plate 61. When, however, it is desired to engage the point 88 with said plate, the treadle mechanism is actuated to elevate the member 94 so that the spring 90 will move the work point supporting arm 78 toward the work support 59 while still engaging said arm 78 with the member 94. Hence, the member 94 in its movements may be used to control the rate of movement of the arm 78 toward the plate, and will always be in a position where, by releasing the treadle mechanism, the work point 88 will be automatically moved out of engaging relation with the plate 61 as a result of downward and forward movement of the plate 94 by the spring 100.

The spring 90 may be a fairly light spring, as merely sufficient pressure at the point 88 is required to cause said point to penetrate the resist upon the plate 61, it being highly undesirable, where good work is required, to permit said point to penetrate or scratch the surface of said plate.

When all of the letters of the alphabet and digits are upon a pattern plate 28, it is necessary to space succeeding letters by a movement of the support 59 upon the support 56 carried by the pedestals 22 and 23. This is accomplished by means of the lead screw 64 and its actuating handle 65, the gauge wheel 66 and stop pawl 67 permitting a desired regulation of the operative effect of said lead screw for spacing purposes. With the set of the machine shown in the drawings, the movement of the support 59 will be toward the right of the machine when spacing the letters.

It is to be noted that the employment of a T-square 60 adjustable vertically upon the support 59 will permit the plate 61 to be brought into any desired position vertically of said support, and that the substantially vertical position of the face of said support, or its right angular arrangement with relation to the pattern table 24, permits the operator to simultaneously watch both the pattern plate 28 and the work plate 61.

From the foregoing it will be seen that the essential characteristic of the present invention, or the normal functioning of the machine, is the employment of a pattern supporting table and a work support arranged at substantially right angles to each other and so spaced as to permit the operator to, at the same time, observe both the tracing stylus and the reproducing work point, a construction necessarily involving a pantographic reproducing mechanism in which the movements corresponding with the fore and aft lines in the pattern, or the theoretical vertical lines thereof, will be converted into a literal vertical movement of the work point. It is to be understood that where I have referred to vertical movements, I have included therein the vertical component of movement where there is simultaneous vertical and lateral movement in following the lines, as in the formation of oblique or curved lines.

These general or normal operative effects may be modified by means of different adjustable mechanisms in the machine, when it is desired that the reproduction differ in some of its characteristics from the pattern, such as condensing or extending the letters or other characters by a variance in the length of the vertical lines as compared with that of the horizontal or lateral lines, or by a variance in the length of the horizontal or lateral lines as compared with that of the vertical lines. Again these adjustments may be used when it is desired to impart a tilt, or obliquity to the letters or other characters, either forwardly or rearwardly, whether the letters or other characters are reproduced to scale or extended or condensed as above referred to.

If it be desired to vary the length of the lateral or horizontal lines in the reproduction, this may be done by the usual adjustment of the ring 40, the operative effect of which adjustment is well known in this art, and therefore requires no detailed explanation. The variance in the length of the vertical lines of the reproduction may be secured by the adjustment of the actuating member 75. To secure this adjustment, it is merely necessary to loosen the jamb nut 112 and rotate the member 75 about its pivotal support 110 so as to increase or decrease its angle of inclination. If the angle of inclination be increased, the result will be an increase in the length of the vertical lines of the reproduction. If the angle be decreased, or made more acute, the result will be a decrease in the length of such lines. This condition prevails irrespective of whether the setting of the member 75 is such as to reproduce the letters or other characters so that they will read in the same direction as in the pattern, and as shown in Fig. 1 of the drawings, or whether it be given the reverse pitch or inclined toward the rear of the machine so as to reverse the letters upon the reproduction, or place them upside down.

Fig. 10 illustrates the adjustment of the member 75 when the letters are to be reversed, and Fig. 11 shows the adjustment when the angle of inclination of the member 75 is the same as shown in Fig. 1 of the drawings, except as to the pitch of the traction surface of this member. The capability of the adjustment or variance in the degree of inclination of the member 75 results from the fact that the lifting action of said member, with the same quantity of movement fore and aft of the machine, will vary with any change in the pitch of inclination; the higher the pitch, the greater the quantity of vertical movement, and the lower the pitch, the lesser the quantity of such movement. It is to be noted that if the member 75 be set as shown in Fig. 9 so that its upper surface engaging the wheel 74 is upon a horizontal plane, there will be no vertical movement of the work point 88, this point being held in the zero position as to its vertical movement.

The lateral movements of the member 75 will always impart the same degree of lateral movement to the frame 70 and the work point as a result of lateral thrust exerted upon the wheel 74 by said member 75. The adjustment of the inclination of the member 75 cannot in any way vary the degree of lateral movement imparted therethrough to the work point.

When it is desired to impart obliquity to the lines in the reproduction corresponding with the vertical lines on the pattern, or the lines having a vertical pitch, it is merely necessary to release the set screw 108, swivel the sleeve 107 about the vertical axis of the stud 106 either to the left or to the right, as shown in Figs. 13 and 14 respectively. If the vertical and lateral pitch of the member 75 be as shown in Figs. 11 and 13, the letters in the reproduction will be pitched to the right, and the effect would be the same if the vertical and lateral pitch of the member 75 be the same as shown in Figs. 10 and 13, since notwithstanding that the movement of the work point would be the reverse of that immediately above referred to, the inversion of the letters will cause the reproduction to have the same pitch. Assuming that the member 75 is set as shown in Figs. 11 and 14, the reproduction will have a pitch to the left, while if the setting be as shown in Figs. 10 and 14, the pitch would be the same for the reasons stated above in connection with the setting in accordance with Figs. 10 and 13.

Since the degree of inclination of the member 75, fore and aft of the machine, does not in any way affect the lateral component of motion introduced into the vertical lines as a result of the inclination laterally of the machine as shown in Figs. 13 and 14, it is apparent that the adjustment shown in Figs. 13 and 14 may be used irrespective of the scale of reproduction, or whether this scale is an exact scale or is modified to condense or extend the vertical dimensions of the reproduction.

It is apparent that the degree of tilt or inclination of the reproduced letters may be varied by changing the degree of lateral angularity or inclination of the member 75 from that shown in Figs. 13 and 14.

It is to be understood that the scale of the reproduction may be secured, or varied, by adjusting the sleeve 38 vertically of the column 21 in the usual and well known manner, upward adjustment reducing the scale, and downward adjustment increasing the scale.

The functioning of the rod 101 is merely for the purpose of correcting any tendency of the carriage 30 to have a twisting action as it receives universal movement through the transmitter arm 37—51, particularly during lateral movements of the carriage.

For securing line spacing upon a plate, the knurled handhold 84 is used to simultaneously actuate the pinion 83 and the ratchet wheel 85 to impart movement to the sleeve 79 longitudinally of the work point supporting arm 78. While the ratchet wheel 85 and pawl 86 will ordinarily serve to hold the sleeve 79 and the mount 87 carried thereby in any adjusted position, I prefer to use the tongue 81 co-operating with the notches or recesses 80 in the arm 78 for supplementing the action of said pawl and ratchet mechanism.

It will be readily understood that if the letters or characters of the reproduction are readable from the same position as those upon the pattern, that movement of the sleeve 79 will of necessity be downwardly in setting the machine for the making of succeeding lines, while if the letters or characters of the reproduction be reversed, the spacing movement of the sleeve 79 will necessarily be upward.

The manner of connecting the stylus arm 54 with the telescoping extension 51 of the transmitter arm 37, is such as to minimize lost motion in this connection, but the construction employed is not essential to the invention. When the construction is used, however, fore and aft movement of the stylus arm will cause the side and cross bars 46—47 and the carriage 49 to move longitudinally of the machine upon the bearing balls 45. Lateral movements of said stylus arm will impart movement to the carriage 49 laterally of the machine, the bars 46—47 having no movement therewith. Of course, it will be readily understood that when the vertical movement has a lateral component, or vice versa, there will be simultaneous movement of the bars 46—47 fore and aft of the machine and of the carriage 49 laterally of the machine, the relative movement of the parts defining the character of the lines reproduced in the reproduction.

The retard members 105 serve merely to check a tendency of the bars 46—47 and the carriage 49 to overrun during their rearward movement when they are largely relieved from the load of the frame 70 because the member 75 is pitched as shown in Figs. 1 and 11 of the drawings, or during the forward movement of said parts because the member 75 is pitched as shown in Fig. 10 of the drawings.

The clamps 26 and 27 are provided solely for the purpose of permitting the pattern plate 28 to be quickly set upon the table 24 and as quickly re-set when movement of the pattern plate is required to bring succeeding letters into the same position upon said table 24.

It is desired to call attention to the fact that the pressure exerted by the work point 88 against the plate 61 is a fairly light pressure, since the sole work required of this point is the removal of resist from the surface of said plate to facilitate a subsequent acid etching of the plate. The short leverage at which the spring 90 acts upon the arm 78 ensures the desired pressure contact, and also avoids any material variation in the degree thereof as a result of the shifting of the sleeve 79 longitudinally of the work point supporting arm 78.

By offsetting the mount 87 laterally of the supporting arm 78, the reproduced lines will always be at one side of said arm so as to permit the desired inspection to determine the quality of these lines.

It is apparent that the manner of mounting the carriage 30 and the frame 70 so as to permit universal movement of said carriage upon a single plane, and corresponding lateral, and also a vertical movement of said frame, may be varied from that shown in the drawings, the construction shown being merely an approved mechanism for permitting the necessary movement of these parts. In using the term "approved," I refer to a construction which I have found satisfactory in use, and one not calculated to permit such lost motion as would result in inaccuracy in the reproduction.

While avoidance of lost motion with resultant accuracy in the reproduction throughout all parts thereof is secured by the employment of the bars 46—47, and the carriage 49, and by mounting these parts in the manner described, I would not be understood as limiting myself to a machine in which this construction is necessarily employed. This construction, however, is desirable, since it maintains the lower end of the telescoping extension 51 of the transmitter arm upon a horizontal plane, and thus compensates for that slight elongation of the transmitter arm 37—51 resulting from its oscillations under the control of the stylus arm 54.

It is not my intention to limit the invention to the precise details of construction shown in the drawings, as to the above or other respects, it being apparent that such may be varied while still preserving the essential characteristics of the invention, and securing the desired operative effects.

Having described the invention, what I claim as new and desire to have protected by Letters Patent, is:—

1. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, a transmitter arm operative upon said actuating means, a pivotal support permitting universal movement of said arm, a tracing stylus, and operative connections between said stylus and said transmitter arm.

2. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

3. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, a transmitter arm operative upon said actuating means, a tracing stylus, and operative connections between said stylus and said transmitter arm.

4. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein an actuating member capable of imparting lateral lineal movement and vertical oscillatory movement thereto, means whereby said actuating member may be adjusted to vary the quantity of vertical movement of said work point supporting arm independently of any variance in the quantity of its lateral movement, a transmitter arm operative upon said actuating means, a tracing stylus and operative connections between said stylus and said transmitter arm.

5. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to impart a horizontal component of movement to said work point supporting arm during its vertical movement, a transmitter arm operative upon said actuating means, a tracing stylus, and operative connections between said stylus and said transmitter arm.

6. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein an actuating member capable of imparting lateral lineal movement and vertical oscillatory movement thereto, means whereby said actuating member may be adjusted to impart a horizontal component of movement to said work point supporting arm during its vertical movement, a transmitter arm operative upon said actuating means, a tracing stylus and operative connections between said stylus and said transmitter arm.

7. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, means whereby said actuating means may be adjusted to impart a horizontal component of movement to said work point supporting arm during its vertical movement, a transmitter arm operative upon said actuating means, a tracing stylus, and operative connections between said stylus and said transmitter arm.

8. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein an actuating member capable of imparting lateral lineal movement and vertical oscillatory movement thereto, means whereby said actuating member may be adjusted to vary the quantity of vertical movement of said work point supporting arm independently of any variance in the quantity of its lateral movement, means whereby said actuating member may be adjusted to impart a horizontal component of movement to said work point supporting arm during its vertical movement, a transmitter arm operative upon said actuating means, a tracing stylus and operative connections between said stylus and said transmitter arm.

9. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, means controlling the movement of said arm to cause a work point carried thereby to be engaged with, or disengaged from, a plate upon said work support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

10. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, a spring acting upon and having a normal tendency to move said arm towards said work support, a laterally elongated bearing member adapted to operatively engage said arm and control the operative effect of said spring, means varying the position of said bearing member whereby said arm is permitted to have movement toward said work support under the control of said spring, or may be moved and held away from said work support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

11. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, a spring acting upon and having a normal tendency to move said arm towards said work support, a laterally elongated bearing member adapted to operatively engage said arm and control the operative effect of said spring, an oscillatory support for said bearing member, a link and lever mechanism operative upon said support whereby said arm is permitted to have movement toward said work support under the control of said spring, or may be moved and held away from said work support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

12. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, a spring acting upon and having a normal tendency to move said arm towards said work support, a laterally elongated bearing member adapted to operatively engage said arm and control the operative effect of said spring, means varying the position of said bearing member whereby said arm is permitted to have movement toward said work support under the control of said spring, or may be moved and held away from said work support, means whereby the tension of said spring may be varied to control the pressure relation between a work point carried by said arm and a work plate upon said support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

13. An etching or like machine embodying therein a pattern table, a work support adjacent and extending at substantially right angles thereto, a work point supporting arm, a sleeve mounted upon said arm, a work point holder carried by said sleeve, means whereby said sleeve may be adjusted longitudinally of said arm to bring said work point holder into operative relation with different parts of a plate upon said work support, actuating means operative to impart lineal movement to said work tool supporting arm laterally of the machine, and vertical movement thereto, a transmitter arm operative upon said actuating means, a tracing stylus, and operative connections between said stylus and said transmitter arm.

14. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, a sleeve mounted upon said arm, a work point holder carried by said sleeve, means whereby said sleeve may be adjusted longitudinally of said arm to bring said work point holder into operative relation with different parts of a plate upon said work support, means controlling the movement of said arm to cause a work point carried by said work point holder to be engaged with, or disengaged from, a plate upon said work support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

15. An etching or like machine embodying therein a pattern table, a work support adjacent and extending at substantially right angles thereto, a work point supporting arm, a sleeve mounted upon said arm, a work point holder carried by said sleeve, a rack extending longitudinally of said arm, a pinion carried by said sleeve and in mesh with said rack, a pawl and ratchet mechanism carried by said sleeve and said pinion respectively, co-operating gauge members carried by said sleeve and said arm, actuating means operative to impart lineal movement to said work tool supporting arm laterally of the machine, and vertical movement thereto, a transmitter arm operative upon said actuating means, a tracing stylus, and operative connections between said stylus and said transmitter arm.

16. An etching or like machine embodying therein a pattern table, a work support adjacent and extending at substantially right angles thereto, a frame, means permitting said frame to have movement laterally of the machine, and a vertical pivotal movement, a work point supporting arm pendent from said frame and extending adjacent said work support, pivotal connections between said arm and said frame whereby said arm is permitted to have movement toward and from said work support, a sleeve mounted upon said arm, a work point holder carried by said sleeve, a rack extending longitudinally of said arm, a pinion carried by said sleeve and in mesh with said rack, a pawl and ratchet mechanism carried by said sleeve and said pinion respectively, co-operating gauge members carried by said sleeve and said arm, means controlling the movement of said arm to cause a work point carried by said work point holder to be engaged with, or disengaged from, a plate upon said work support, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

17. An etching or like machine embodying therein a pattern table, laterally extending ways adjacent said pattern table, a carriage mounted on said ways, means whereby movement may be imparted to said carriage along said ways in either direction, a work support upon said carriage and extending at substantially right angles to said pattern table, a work point supporting arm, actuating means operative to impart lineal movement to said work tool supporting arm laterally of the machine, and vertical movement thereto, a transmitter arm operative upon said actuating means, a tracing stylus, and operative connections between said stylus and said transmitter arm.

18. An etching or like machine embodying therein a pattern table, laterally extending ways adjacent said pattern table, a carriage mounted on said ways, a lead screw mounted adjacent said ways and co-acting with co-operating screw threads upon said carriage, and means co-operating with said lead screw whereby accuracy in the spacing of said carriage by said screw may be secured, a work support upon said carriage and extending at substantially right angles to said pattern table, a work point supporting arm, actuating means operative to impart lineal movement to said work tool supporting arm laterally of the machine, and vertical movement thereto, a transmitter arm operative upon said actuating means, a tracing stylus, and operative connections between said stylus and said transmitter arm.

19. An etching or like machine embodying therein a pattern table, a work support of easel-like construction having a base occupying a substantially vertical plane, a T-square mounted to have adjustment vertically of said support, a bar having a sequence of spaced openings carried by said support, a pin adapted to be positioned in said openings respectively, whereby a plate may be firmly held between said T-square and said pin, a work point supporting arm, actuating means operative to impart lineal movement to said work tool supporting arm laterally of the machine, and vertical movement thereto, a transmitter arm operative upon said actuating means, a tracing stylus, and operative connections between said stylus and said transmitter arm.

20. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein a carriage, means whereby said carriage is permitted to have universal movement upon a horizontal plane, an actuating member having a rectilineal traction surface mounted upon said carriage, means whereby said actuating member may be adjusted about a horizontal axis to vary the angular arrangement of its traction surface, means carried by said frame co-operating with said traction surface whereby lateral movement of said carriage will impart similar lateral movement to said frame, and longitudinal movement of said carriage will cause movement of said actuating member with relation to the means carried by said frame and co-operating with said member, and impart vertical movement to said frame, a transmitter arm operatively connected with said carriage, a tracing stylus, and operative connections between said stylus and said transmitter arm.

21. An etching or like machine embodying therein a pattern table, a work support adjacent and extending at substantially right angles thereto, a frame, means permiting said frame to have movement laterally of the machine, and a vertical pivotal movement, a work point supporting arm carried by said frame, and actuating means for said frame including therein a carriage, means whereby said carriage is permitted to have universal movement upon a horizontal plane, an actuating member having a rectilineal traction surface mounted upon said carriage, said surface extending at an angle to the horizontal, means carried by said frame co-operating with said traction surface whereby lateral movement of said carriage will impart similar lateral movement to said frame, and longitudinal movement of said carriage will cause movement of said actuating member with relation to the means carried by said frame and co-operating with said member, and impart vertical movement to said frame, means permitting said actuating member to be adjusted about a vertical axis whereby said member may be so set as to vary its operation in imparting lateral movement to said frame, a transmitter arm operatively connected with said carriage, a tracing stylus, and operative connections between said stylus and said transmitter arm.

22. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein a carriage, means whereby said carriage is permitted to have universal movement upon a horizontal plane, an actuating member having a rectilineal traction surface mounted upon said carriage, means whereby said actuating member may be adjusted about a horizontal axis to vary the angular arrangement of its traction surface, means carried by said frame co-operating with said traction surface whereby lateral movement of said carriage will impart similar lateral movement to said frame, and longitudinal movement of said carriage will cause movement of said actuating member with relation to the means carried by said frame and co-operating with said member, and impart vertical movement to said frame, means permitting said actuating member to be adjusted about a vertical axis whereby said member may be so set as to vary its operation in imparting lateral movement to said frame, a transmitter arm operatively connected with said carriage, a tracing stylus, and operative connections between said stylus and said transmitter arm.

23. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein a carriage, means whereby said carriage is permitted to have universal movement upon a horizontal plane, and actuating member having a rectilineal traction surface mounted upon said carriage, said surface extending at an angle to the horizontal, means carried by said frame co-operating with said traction surface whereby lateral movement of said carriage will impart similar lateral movement to said frame, and longitudinal movement of said carriage will cause movement of said actuating member with relation to the means carried by said frame and co-operating with said member, and impart vertical movement to said frame, means permitting said actuating member to be adjusted about a vertical axis whereby said member may be so set as to vary its operation in permitting lateral movement to said frame, means permitting the means carried by said frame co-operating with said traction surface to be adjusted about a vertical axis, a transmitter arm operatively connected with said carriage, a tracing stylus, and operative connections between said stylus and said transmitter arm.

24. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein a carriage, means whereby said carriage is permitted to have universal movement upon a horizontal plane, an actuating member having a rectilineal traction surface mounted upon said carriage, means whereby said actuating member may be adjusted about a horizontal axis to vary the angular arrangement of its traction surface, means carried by said frame co-operating with said traction surface whereby lateral movement of said carriage will impart similar lateral movement to said frame, and longitudinal movement of said carriage will cause movement of said actuating member with relation to the means carried by said frame and co-operating with said member, and impart vertical movement to said frame, means permitting said actuating member to be adjusted about a vertical axis whereby said member may be so set as to vary its operation in imparting lateral movement to said frame, means permitting the means carried by said frame co-operating with said traction surface to be adjusted about a vertical axis, a transmitter arm operatively connected with said carriage, a tracing stylus, and operative connections between said stylus and said transmitter arm.

25. An etching or like machine embodying therein a pattern table, a work support adjacent and extending at substantially right angles thereto, a laterally extending track having a raceway for bearing balls above said work support, a frame a laterally extending track carried thereby and parallel with said last named laterally extending track and having a downwardly presented raceway for bearing balls therein, bearing balls between said tracks whereby said frame is permitted to have rectilineal movement laterally of the machine, and a vertical pivotal movement, a work point supporting arm carried by said frame, and actuating means for said frame including therein an actuating member capable of imparting lateral lineal movement and vertical oscillatory movement thereto, a transmitter arm operative upon said actuating means, a tracing stylus and operative connections between said stylus and said transmitter arm.

26. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, a transmitter arm operative upon said actuating means, a sleeve, a forked arm thereon, a universal connection between said forked arm and said transmitter arm, a vertical support for said sleeve, means whereby said sleeve may be adjusted upon said vertical support to vary the scale of the reproduction, a tracing stylus, and operative connections between said stylus and said transmitter arm.

27. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, a transmitter arm operative upon said actuating means, a sleeve, a forked arm thereon, a universal connection between said forked arm and said transmitter arm, a vertical support for said sleeve, means whereby said sleeve may be adjusted upon said vertical support to vary the scale of the reproduction, a tracing stylus, and operative connections between said stylus and said transmitter arm.

28. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, and actuating means for said frame including therein an actuating member capable of imparting lateral lineal movement and vertical oscillatory movement thereto, a transmitter arm operative upon said actuating means, a universal support for said arm arranged intermediate its ends and including a sleeve movable longitudinally of said arm and right angularly arranged pivots extending laterally and longitudinally of the machine respectively, means whereby said sleeve may be adjusted with relation to said arm to vary the leverage of said arm about said longitudinally extending pivots only, a tracing stylus and operative connections between said stylus and said transmitter arm.

29. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, a transmitter arm operative upon said actuating means, a sleeve, a forked arm thereon, a universal support for said transmitter arm including a sleeve arranged intermediate its ends and movable longitudinally thereof, and right angularly arranged pivots extending laterally and longitudinally of the machine respectively, means whereby said last named sleeve may be adjusted with relation to said transmitter arm to vary the leverage of said arm about said longitudinally extending pivots only, a vertical support for said first named sleeve, means whereby said first named sleeve may be adjusted upon said vertical support to vary the leverage of both of said right angularly arranged pivots, a tracing stylus, and operative connections between said stylus and said transmitter arm.

30. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to impart a horizontal component of movement to said work point supporting arm during its vertical movement, a transmitter arm operative upon said actuating means, a sleeve, a forked arm thereon, a universal connection between said forked arm and said transmitter arm, a vertical support for said sleeve, means whereby said sleeve may be adjusted upon said vertical support to vary the scale of the reproduction, a tracing stylus, and operative connections between said stylus and said transmitter arm.

31. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to impart a horizontal component of movement to said work point supporting arm during its vertical movement, a transmitter arm operative upon said actuating means, a universal support for said arm arranged intermediate its ends and including a sleeve movable longitudinally of said arm and right angularly arranged pivots extending laterally and longitudinally of the machine respectively, means whereby said sleeve may be adjusted with relation to said arm to vary the leverage of said arm about said longitudinally extending pivots only, a tracing stylus and operative connections between said stylus and said transmitter arm.

32. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to impart a horizontal component of movement to said work point supporting arm during its vertical movement, a transmitter arm operative upon said actuating means, a sleeve, a forked arm thereon, a universal support for said arm including a sleeve arranged intermediate its ends and movable longitudinally thereof, and right angularly arranged pivots extending laterally and longitudinally of the machine respectively, means whereby said last named sleeve may be adjusted with relation to said transmitter arm to vary the leverage of said arm about said longitudinally extending pivots only, a vertical support for said first named sleeve, means whereby said first named sleeve may be adjusted upon said vertical support to vary the leverage of both of said right angularly arranged pivots, a tracing stylus, and operative connections between said stylus and said transmitter arm.

33. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, means whereby said actuating means may be adjusted to impart a horizontal component of movement to said work point supporting arm during its vertical movement, a transmitter arm operative upon said actuating means, a sleeve, a forked arm thereon, a universal connection between said forked arm and said transmitter arm, a vertical support for said sleeve, means whereby said sleeve may be adjusted upon said vertical support to vary the scale of the reproduction, a tracing stylus, and operative connections between said stylus and said transmitter arm.

34. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, means whereby said actuating means may be adjusted to impart a horizontal component of movement to said work point supporting arm during its vertical movement, a transmitter arm operative upon said actuating means, a universal support for said arm arranged intermediate its ends and including a sleeve movable longitudinally of said arm and right angularly arranged pivots extending laterally and longitudinally of the machine respectively, means whereby said sleeve may be adjusted with relation to said arm to vary the leverage of said arm about said longitudinally extending pivots only, a tracing stylus and operative connections between said stylus and said transmitter arm.

35. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, means whereby said actuating means may be adjusted to vary the quantity of vertical movement of said work point supporting arm independently of any variance in the quantity of its lateral movement, means whereby said actuating means may be adjusted to impart a horizontal component of movement to said work point supporting arm during its vertical movement, a transmitter arm operative upon said actuating means, a sleeve, a forked arm thereon, a universal support for said transmitter arm including a sleeve arranged intermediate its ends and movable longitudinally thereof, and right angularly arranged pivots extending laterally and longitudinally of the machine respectively, means whereby said last named sleeve may be adjusted with relation to said transmitter arm to vary the leverage of said arm about said longitudinally extending pivots only, a vertical support for said first named sleeve, means whereby said first named sleeve may be adjusted upon said vertical support to vary the leverage of both of said right angularly arranged pivots, a tracing stylus, and operative connections between said stylus and said transmitter arm.

36. An etching or like machine embodying therein a pattern table, a work support adjacent and extending at substantially right angles thereto, a frame, means permitting said frame to have movement laterally of the machine, and a vertical pivotal movement, a work point supporting arm carried by said frame, a fixed supporting frame, a carriage, triangularly arranged pairs of cupped bearing members carried by said frame and said carriage respectively, bearing balls between the members of each pair of cups, whereby said frame is permitted to have universal movement upon a single plane, an actuating member capable of imparting lateral lineal movement and vertical oscillatory movement to said frame, said member having movement with said carriage, a transmitter arm operative upon said carriage, a tracing stylus, operative connections between said stylus and said transmitter arm, a link extending parallel with said transmitter arm, and universal joints connecting the opposite ends of said link respectively with said carriage and with a fixed portion of the machine, whereby skewing action of said carriage is prevented.

37. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, parallel tracks extending longitudinally of the machine adjacent said pattern table, a carriage mounted to have movement along said tracks, a laterally extending cross bar upon said carriage and having an upwardly presented raceway for bearing balls, a second carriage having a downwardly presented raceway engaging the bearing balls in said last named raceway, whereby said last named carriage is permitted to have movement longitudinally of the machine with said first named carriage, movement laterally of the machine independently thereof, and a vertical pivotal movement, a telescoping transmitter arm, one end of which is connected by a universal joint to said actuating means, and the other end of which is connected by means of a universal joint with said pivotally movable carriage, a stylus arm secured to, and extending forwardly of, said last named carriage, and a tracing stylus carried by said stylus arm.

38. An etching or like machine embodying therein a pattern table, a work support adjacent and extending at substantially right angles thereto, a work point supporting arm, actuating means operative to impart lineal movement to said work tool supporting arm laterally of the machine, and vertical movement thereto, parallel tracks extending longitudinally of the machine adjacent said pattern table, a carriage mounted to have movement along said tracks, a laterally extending cross bar upon said carriage and having an upwardly presented raceway for bearing balls, a second carriage having a downwardly presented raceway engaging the bearing balls in said last named raceway, whereby said last named carriage is permitted to have movement longitudinally of the machine with said first named carriage, movement laterally of the machine independently thereof, and a vertical pivotal movement, a telescoping transmitter arm, one end of which is connected by a universal joint to said actuating means, and the other end of which is connected by means of a universal joint with said pivotally movable carriage, a stylus arm secured to, and extending forwardly of, said last named carriage, a tracing stylus carried by said stylus arm, and friction devices operative upon said first named carriage to minimize the tendency of this carriage to impart an undesired excess movement to said transmitter arm longitudinally of the machine.

In witness whereof I have hereunto affixed my signature this 14th day of November, 1923.

WILLIAM S. EATON.